United States Patent
Zhou

(10) Patent No.: US 10,805,617 B2
(45) Date of Patent: Oct. 13, 2020

(54) SCALABLE PREDICTION TYPE CODING

(71) Applicant: Texas Instruments Incorporated, Dallas, TX (US)

(72) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 857 days.

(21) Appl. No.: 13/746,063

(22) Filed: Jan. 21, 2013

(65) Prior Publication Data

US 2013/0188704 A1 Jul. 25, 2013

Related U.S. Application Data

(60) Provisional application No. 61/588,491, filed on Jan. 19, 2012.

(51) Int. Cl.
*H04N 19/11* (2014.01)
*H04N 19/176* (2014.01)
*H04N 19/174* (2014.01)
*H04N 19/119* (2014.01)
*H04N 19/15* (2014.01)
*H04N 19/147* (2014.01)
(Continued)

(52) U.S. Cl.
CPC ......... *H04N 19/176* (2014.11); *H04N 19/119* (2014.11); *H04N 19/13* (2014.11); *H04N 19/147* (2014.11); *H04N 19/15* (2014.11); *H04N 19/174* (2014.11); *H04N 19/50* (2014.11)

(58) Field of Classification Search
CPC ...... H04N 19/11; H04N 19/119; H04N 19/13; H04N 19/174; H04N 19/176

USPC .................................... 375/240.12; 3/240.12
See application file for complete search history.

(56) References Cited

U.S. PATENT DOCUMENTS

2004/0028282 A1* 2/2004 Kato et al. .................... 382/236
2009/0034619 A1* 2/2009 Mukherjee et al. ...... 375/240.16
(Continued)

OTHER PUBLICATIONS

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.
(Continued)

*Primary Examiner* — Jeremiah C Hallenbeck-Huber
(74) *Attorney, Agent, or Firm* — Ebby Abraham; Charles A. Brill; Frank D. Cimino

(57) ABSTRACT

A method for encoding a video sequence is provided that includes signaling in the compressed bit stream that a subset of a plurality of partitioning modes is used for inter-prediction of a portion of the video sequence, using only the subset of partitioning modes for prediction of the portion of the video sequence, and entropy encoding partitioning mode syntax elements corresponding to the portion of the video sequence, wherein at least one partitioning mode syntax element is binarized according to a pre-determined binarization corresponding to the subset of partitioning modes, wherein the pre-determined binarization differs from a pre-determined binarization for the least one partitioning mode syntax element that would be used if the plurality of partitioning modes is used for inter-prediction.

12 Claims, 6 Drawing Sheets

(51) Int. Cl.
 *H04N 19/13* (2014.01)
 *H04N 19/50* (2014.01)

(56) References Cited

U.S. PATENT DOCUMENTS

2011/0310976 A1* 12/2011 Wang .................. H04N 19/176
 375/240.24
2012/0243606 A1* 9/2012 Lainema .............. H04N 19/122
 375/240.12

OTHER PUBLICATIONS

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.

"TMS320DM6467 Digital Media System-on-Chip", SPRS403G, Texas Instruments Incorporated, Dec. 2007, revised Oct. 2010, pp. 1-355.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

* cited by examiner

SCALABLE PREDICTION TYPE CODING

CROSS-REFERENCE TO RELATED APPLICATIONS

This application claims benefit of U.S. Provisional Patent Application Ser. No. 61/588,491 filed Jan. 19, 2012, which is incorporated herein by reference in its entirety.

BACKGROUND OF THE INVENTION

Field of the Invention

Embodiments of the present invention generally relate to scalable prediction type coding in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra-prediction. The resulting prediction error is coded by applying block transforms based on an integer approximation of the discrete cosine transform, which is followed by quantization and entropy coding of the transform coefficients.

The design goal for development of this standard is that HEVC should at least 50% more efficient than the current H.264/AVC high profile. To improve coding efficiency, several coding efficiency enhancement tools are proposed in this new standard, among them the availability of multiple partitioning modes for inter-prediction which include asymmetric partitioning modes referred to as asymmetric motion partitioning (AMP). The multiple partitioning modes are useful for improving the accuracy of motion compensated inter-prediction. However, AMP is difficult to implement in an encoder due to the increased number of compute cycles and increased motion search area needed for some of the asymmetric partitioning modes.

SUMMARY

Embodiments of the present invention relate to methods, apparatus, and computer readable media for scalable prediction type coding. In one aspect, a method for encoding a video sequence in a video encoder to generate a compressed bit stream is provided that includes signaling in the compressed bit stream that a subset of a plurality of partitioning modes is used for inter-prediction of a portion of the video sequence, using only the subset of partitioning modes for prediction of the portion of the video sequence, and entropy encoding partitioning mode syntax elements corresponding to the portion of the video sequence, wherein at least one partitioning mode syntax element is binarized according to a pre-determined binarization corresponding to the subset of partitioning modes, wherein the pre-determined binarization differs from a pre-determined binarization for the least one partitioning mode syntax element that would be used if the plurality of partitioning modes is used for inter-prediction.

In one aspect, an apparatus for encoding a video sequence to generate a compressed bit stream is provided that includes means for signaling in the compressed bit stream that a subset of a plurality of partitioning modes is used for inter-prediction of a portion of the video sequence, means for using only the subset of partitioning modes for prediction of the portion of the video sequence, and means for entropy encoding partitioning mode syntax elements corresponding to the portion of the video sequence, wherein at least one partitioning mode syntax element is binarized according to a pre-determined binarization corresponding to the subset of partitioning modes, wherein the pre-determined binarization differs from a pre-determined binarization for the least one partitioning mode syntax element that would be used if the plurality of partitioning modes is used for inter-prediction.

In one aspect, a method for decoding a compressed video bit stream in a video decoder to recover a video sequence is provided that includes decoding a partitioning enablement flag from the compressed bit stream, wherein the partitioning enablement flag indicates that a subset of a plurality of partitioning modes was used to encode a portion of the video sequence in the compressed bit stream, and entropy decoding partitioning mode syntax elements corresponding to the portion of the video sequence, wherein at least one partitioning mode syntax element is debinarized according to a pre-determined binarization corresponding to the subset of partitioning modes, wherein the pre-determined binarization differs from a pre-determined binarization for the least one partitioning mode syntax element that would be used if the plurality of partitioning modes was used for inter-prediction.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
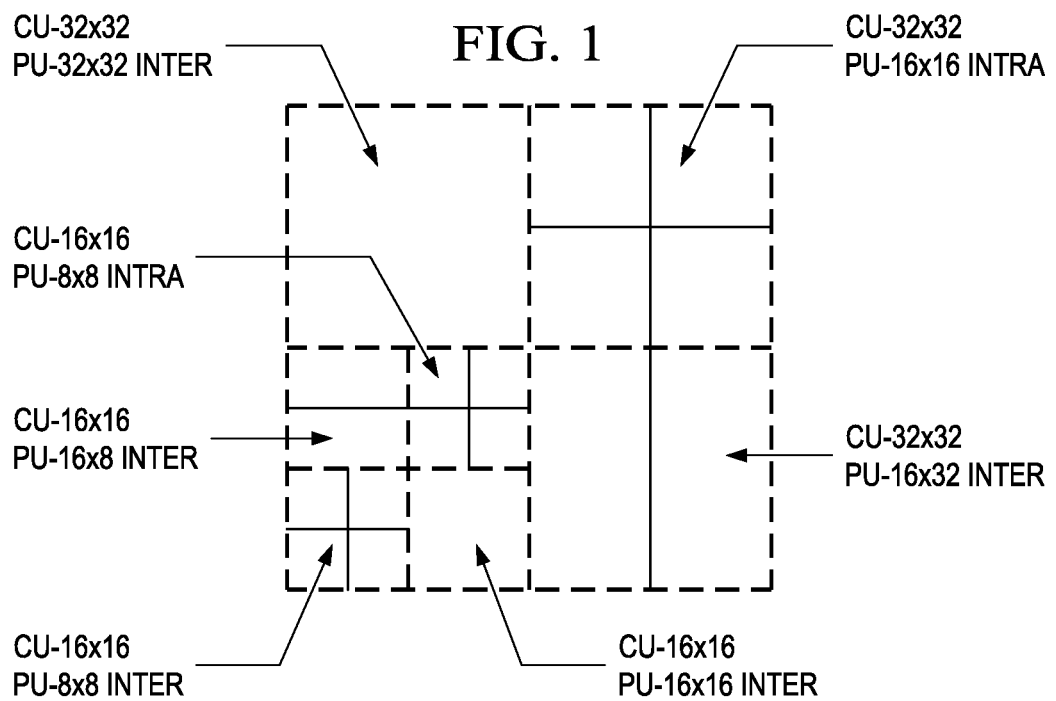
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments may be described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CUs) and CUs may be partitioned into prediction units (PUs). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) specified for a picture. In recent versions of HEVC, the minimum CU size permitted is 8×8.

The coding node is the root node of two trees, a prediction tree and a transform tree. A prediction tree specifies the position and size of prediction units (PU) for a CU. A transform tree specifies the position and size of transform units (TU) for a CU. A transform unit may not be larger than a CU and the size of a transform unit may be 4×4, 8×8, 16×16, and 32×32. The sizes of the TUs and PUs for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d1, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

Figure 2:
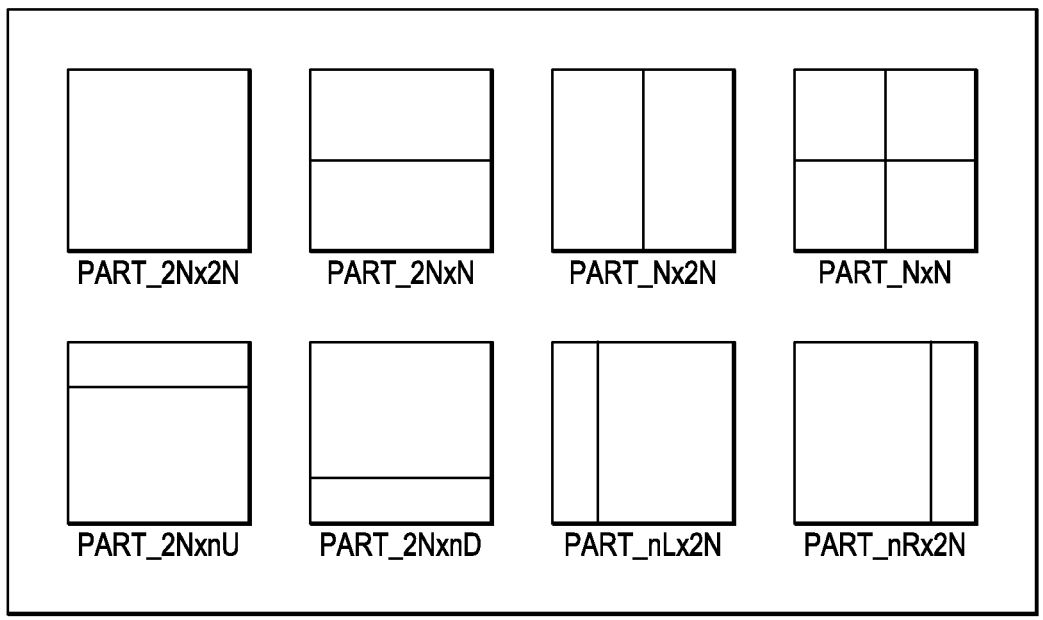
FIG. 2 is an example of partitioning modes for prediction.

As previously mentioned, HEVC includes a provision for using multiple partitioning modes for inter-prediction, i.e., multiple PU sizes, which include some asymmetric partitioning modes. In recent versions of the specification, such as WD5 and later, eight partitioning modes are proposed with four asymmetric partitioning modes. FIG. 2 illustrates the eight partitioning modes, i.e., square symmetric partitioning modes PART_2N×2N, PART_N×N, non-square symmetric partitioning modes PART_2N×N, PART_N×2N, and asymmetric partitioning modes PART_2N×nU, PART_2N×nD, PART_nL×2N, and PART_nR×2N. In this figure, N is one half of the horizontal/vertical size of a CU of size 2N×2N. Further, n is the horizontal or vertical size of the smaller of the two PUs in an asymmetrical partitioning mode. For example, if the CU size is 16×16, n is 4 for an asymmetrical partitioning mode. For PART_2N×nU, the U stands for the upper PU partition. For PART_2N×nD, the D stands for the lower (down) PU partition. Accordingly, assuming a CU size of 16×16, for PART_2N×nU, the upper PU size is 16×4 and the lower PU size is 16×12. For PART_2N×nD, the upper PU size is 16×12 and the lower PU size is 16×4. For PART_nL×2N, the L stands for the left PU partition. For PART_nR×2N, the R stands for the right PU partition. Accordingly, assuming a CU size of 16×16, for PART_nL×2N, the left PU size is 4×16 and the right PU size is 12×16. For PART_nR×2N, the left PU size is 12×16 and the right PU size is 4×16.

While the multiple partitioning modes are useful for improving the accuracy of motion compensated inter-prediction, the asymmetric partitioning modes are difficult to implement in an encoder due to the increased number of compute cycles and increased motion search area needed for some of the asymmetric partitioning modes. In general, the asymmetrical partitioning modes double the motion estimation complexity in the encoder as compared to supporting only the symmetric partitioning modes PART_2N×2N, PART_2N×N PART_N×2N, and PART_N×N. Since the additional coding efficiency benefit of asymmetrical partitioning modes is somewhat limited when compared to other partitioning modes, some encoder implementations may choose to not to support the asymmetrical partitioning to avoid the cost of the additional complexity. Further, some encoder implementations may choose to not support the non-square symmetric partitioning modes PART_2N×N and PART_N×2N to achieve an even more aggressive quality versus implementation cost trade-off.

However, whether or not an encoder chooses to support all partitioning modes or a subset of the partitioning modes, in WD5 and earlier specification drafts, the binarization of the prediction mode (partitioning mode) is required to be performed as per Table 2 given the name association of Table 1. More specifically, to signal the partitioning mode in the compressed bit stream, the partitioning mode is mapped to the prediction type (inter or intra) based on the rules of Table 1 and the value of the partitioning mode is binarized for entropy encoding according to Table 2. As can be seen from Table 2, the binarization of the partitioning mode differs based on whether or not the current CU is an SCU, the SCU size, and whether or not 4×4 inter-prediction is enabled. Tables 1 and 2 are taken from WD5.

Embodiments of the invention provide for signaling the supported partitioning modes (which may be a subset of the partitioning modes defined in the video coding standard) in the compressed bit stream in a syntax field in, for example, a sequence parameter set, a picture parameter set, and/or a slice header. Further, different partitioning mode signaling and binarization definitions are provided that permit the use of shorter codewords for signaling partitioning modes for better coding efficiency when not all partitioning modes are used.

TABLE 1

| PredMode | part_mode (pred_type) | IntraSplitFlag | PartMode |
|---|---|---|---|
| MODE_INTRA | 0 | 0 | PART_2N×2N |
|  | 1 | 1 | PART_N×N |
| MODE_INTER | 0 | 0 | PART_2N×2N |
|  | 1 | 0 | PART_2N×N |
|  | 2 | 0 | PART_N×2N |
|  | 3 | 0 | PART_N×N |
|  | 4 | 0 | PART_2N×nU |
|  | 5 | 0 | PART_2N×nD |
|  | 6 | 0 | PART_nL×2N |
|  | 7 | 0 | PART_nR×2N |

TABLE 2

| | | | | Bin string | |
| | | | | cLog2CUSize == Log2MinCUSize | |
| PredMode | Value of part_mode (pred_type) | PartMode | cLog2CUSize > Log2MinCUSize | cLog2CUSize == 3 && !inter_4x4_enabled_flag | cLog2CUSize > 3 \|\| inter_4x4_enabled_flag |
|---|---|---|---|---|---|
| MODE_INTRA | 0 | PART_2Nx2N | — | 1 | 1 |
| | 1 | PART_NxN | — | 0 | 0 |
| MODE_INTER | 0 | PART_2Nx2N | 1 | 1 | 1 |
| | 1 | PART_2NxN | 011 | 01 | 01 |
| | 2 | PART_Nx2N | 001 | 00 | 001 |
| | 3 | PART_NxN | — | — | 000 |
| | 4 | PART_2NxnU | 0100 | — | — |
| | 5 | PART_2NxnD | 0101 | — | — |
| | 6 | PART_nLx2N | 0000 | — | — |
| | 7 | PART_nRx2N | 0001 | — | — |

Figure 3:
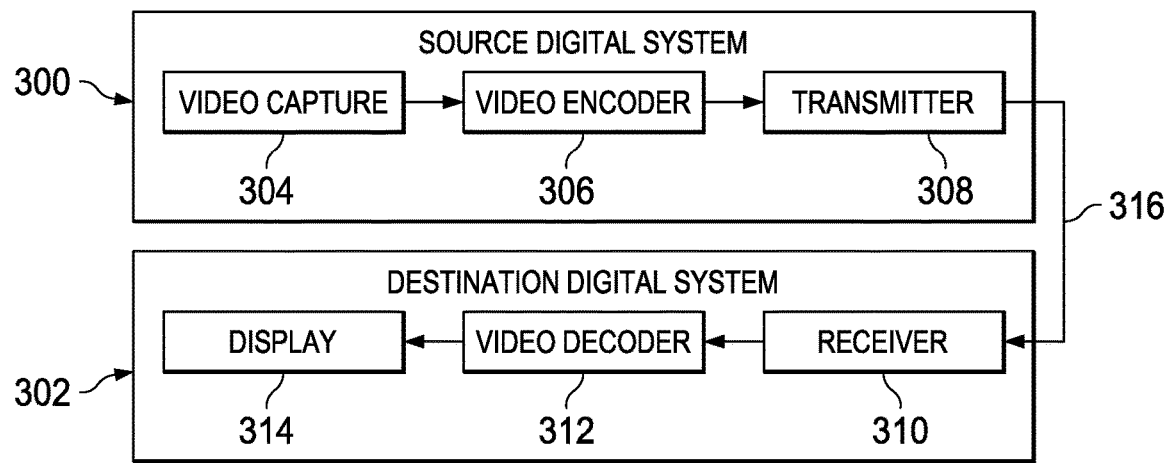
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to use scalable prediction type coding as described herein during the encoding process. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to use scalable prediction type coding as described herein during the decoding process. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
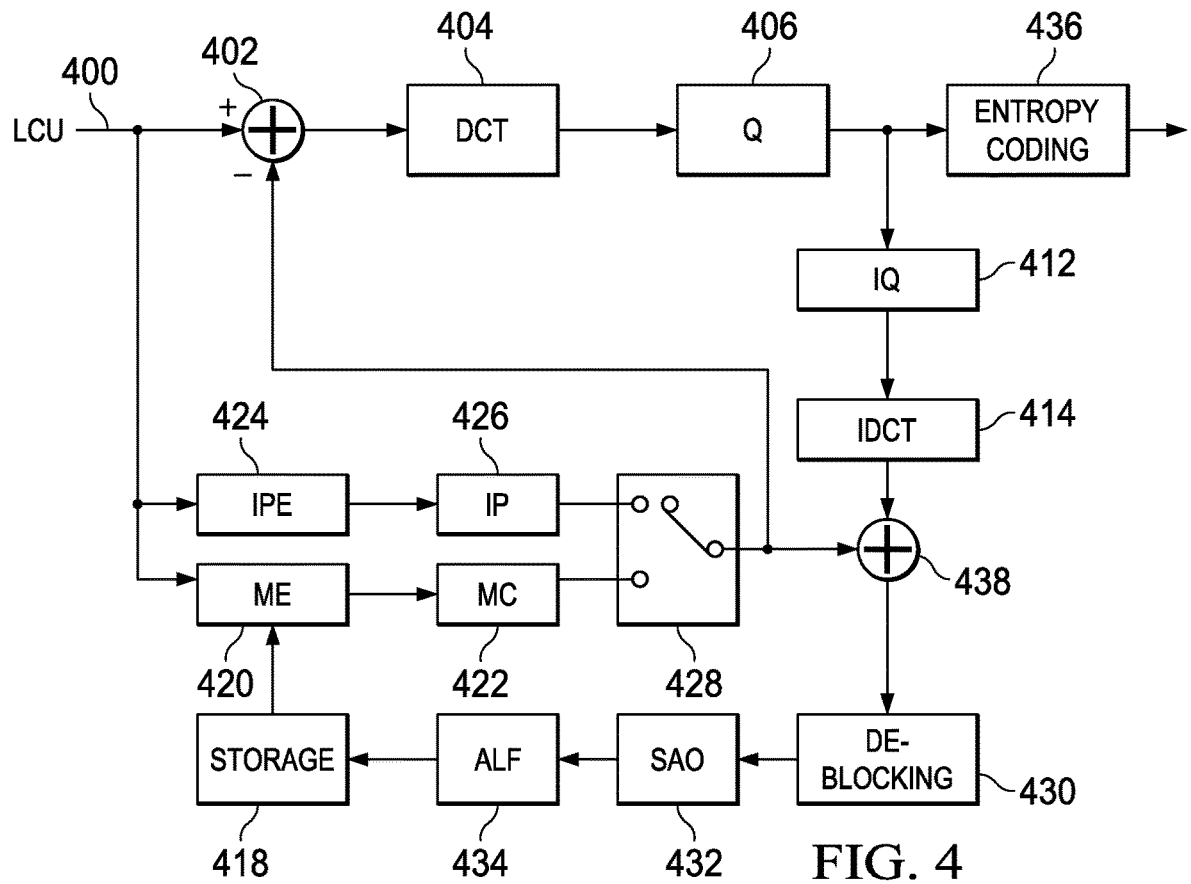
FIG. 4 is a block diagram of a video encoder.

FIG. 4 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

In some embodiments, the video encoder implements all partitioning modes defined by HEVC. In some such embodiments, the coding control component may disable the use of some these partitioning modes in the encoding of an entire video sequence or for parts of a video sequence, e.g., at the picture or slice level. For example, the coding control component may choose to disable the use of the asymmetric partitioning modes, allowing the use of only the symmetric partitioning modes for inter-prediction. Or, the coding control component may choose to disable the use of both the asymmetric partitioning modes and the non-square symmetric partitioning modes, allowing the use of only the square partitioning modes for inter-prediction. The coding control component causes the signaling of which partitioning modes are enabled in the compressed bit stream at the appropriate level (e.g., sequence, picture, or slice) and indicates to the LCU processing which partitioning modes are enabled.

For example, a partitioning enablement flag may be signaled at the appropriate level, e.g., in a sequence parameter set, picture parameter set or slice header, to indicate what partitioning modes are enabled. This flag may indicate that all partitioning modes are enabled, that the asymmetric partitioning modes (i.e., PART_2NxnU, PART_2NxnD, PART_nLx2N, and PART_nRx2N) are disabled, or that both the asymmetric and non-square symmetric partitioning modes (i.e., PART_2NxN and PART_Nx2N) are disabled. Table 3 shows example semantics of such a flag.

In some embodiments, the video encoder implements a subset of the partitioning modes defined by HEVC. In some such embodiments, the video encoder does not implement the asymmetric partitioning modes. In other such embodiments, the video encoder does not implement both the asymmetric partitioning modes and the non-square partitioning modes. In either case, the coding control component causes the signaling of which partitioning modes are enabled in the compressed bit stream at the sequence level. A partitioning enablement flag as previously described may be used for the signaling.

TABLE 3

| AMP_NSQP_enabled_flag (code word) | AMP part modes (PART_2NxnU, PART_2NxnD, PART_nLx2N, PART_nRx2N) | NSQP (PART_2NxN, PART_Nx2N) |
|---|---|---|
| 1 | enabled | enabled |
| 01 | disabled | enabled |
| 00 | disabled | disabled |

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436. In some embodiments, a partitioning enablement flag is also provided to the motion estimation component 420.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), partitioning modes (i.e., PU sizes), and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of various partitioning modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

In embodiments in which the video encoder implements all of the partitioning modes, the partitioning modes tested by the motion estimation component 420 are selected based on the value of the partitioning enablement flag. If this flag indicates that all partitioning modes are enabled, then all of the symmetric and asymmetric modes are available for use. If this flag indicates that asymmetric partitioning modes are disabled, then just the symmetric partitioning modes are available for use. If this flag indicates that asymmetric partitioning modes and non-square symmetric partitioning modes are disabled, then just the square symmetric partitioning modes are available for use.

In embodiments in which the video encoder implements a subset of the partitioning modes, i.e., the subset is the symmetric partitioning modes or the square symmetric partitioning modes, the motion estimation component 420 implements the partitioning modes in the subset.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, partitioning modes (i.e., PU sizes), and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. The partitioning modes consider by the intra-prediction estimation component 424 are limited to the square symmetric partitioning modes. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction and partitioning modes for the CUs, and the quantized transform coefficients for the CUs.

More specifically, the entropy coding component 436 binarizes each syntax element to produce a sequence of binary symbols (bins). The particular sequence of bins to be generated by the binarization process for each syntax element is specified by the video coding standard in use. The entropy encoding component 436 then encodes the resulting bins using context-adaptive binary arithmetic coding to generate the compressed bit stream.

In embodiments in which the video encoder implements all of the partitioning modes, the entropy coding component 436 determines the binarization of partitioning mode syntax elements according to the value of the partitioning enablement flag. If the partitioning enablement flag indicates that all partitioning modes are enabled for inter-prediction, the binarization as per Table 2 is used. If the partitioning enablement flag indicates that asymmetric partitioning modes are disabled, the binarization as per Table 4 is used. If the partitioning enablement flag indicates that asymmetric partitioning modes and non-square symmetric partitioning modes are disabled, the binarization as per Table 5 is used.

Note that if the encoder chooses to enable a subset of the partitioning modes, the coding efficiency of partitioning mode syntax elements is improved. For example, in Table 2, the number of bins generated for the partitioning mode (pred_type) syntax elements is three for partitioning modes PART_2N×N and PART_N×2N (for c Log 2CUSize>Log 2 Min CUSize), while in Table 4, the number of bins generated for the partitioning mode syntax elements for these partitioning modes is two.

In embodiments in which the video encoder implements a subset of the partitioning modes, i.e., the subset is the symmetric partitioning modes or the square symmetric partitioning modes, the entropy coding component 436 implements the binarization of partitioning mode syntax elements according to the particular subset, i.e., the binarization of Table 4 is used if the subset is the symmetric partitioning modes and the binarization of Table 5 is used if the subset is the square symmetric partitioning modes.

TABLE 4

| | | | | Bin string | |
| --- | --- | --- | --- | --- | --- |
| | | | | cLog2CUSize = = Log2MinCUSize | |
| PredMode | Value of part_mode (pred_type) | PartMode | cLog2CUSize > Log2MinCUSize | cLog2CUSize = = 3 && !inter_4x4_enabled_flag | cLog2CUSize > 3 \|\| inter_4x4_enabled_flag |
| MODE_INTRA | 0 | PART_2Nx2N | — | 1 | 1 |
| | 1 | PART_NxN | — | 0 | 0 |
| MODE_INTER | 0 | PART_2Nx2N | 1 | 1 | 1 |
| | 1 | PART_2NxN | 01 | 01 | 01 |
| | 2 | PART_Nx2N | 00 | 00 | 001 |
| | 3 | PART_NxN | — | — | 000 |

TABLE 5

| PredMode | Value of part_mode (pred_type) | PartMode | cLog2CUSize > Log2MinCUSize | Bin string cLog2CUSize == Log2MinCUSize cLog2CUSize == 3 && !inter_4x4_enabled_flag | cLog2CUSize > 3 \|\| inter_4x4_enabled_flag |
|---|---|---|---|---|---|
| MODE_INTRA | 0 | PART_2Nx2N | — | 1 | 1 |
|  | 1 | PART_NxN | — | 0 | 0 |
| MODE_INTER | 0 | PART_2Nx2N | — | 1 | 1 |
|  | 1 | PART_NxN | — | — | 0 |

The LCU processing component 442 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
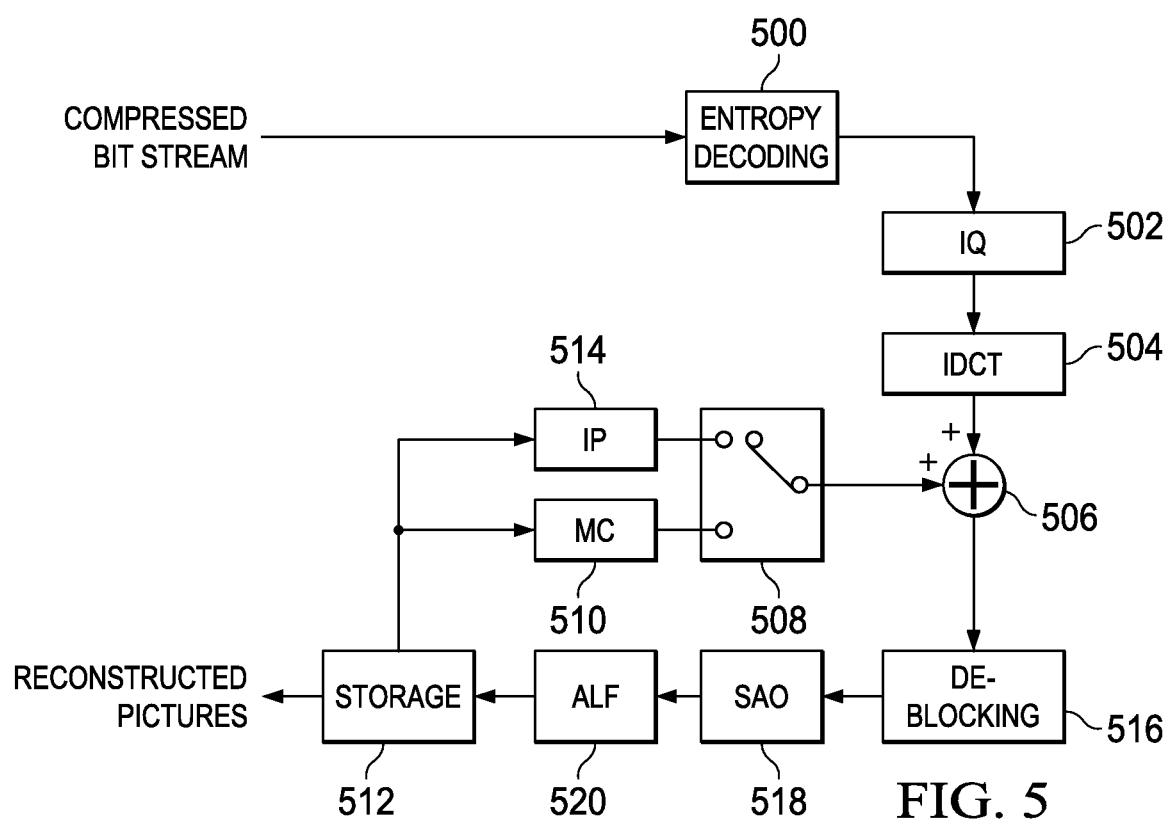
FIG. 5 is a block diagram of a video decoder.

FIG. 5 is a block diagram of an example video decoder. The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, in-loop filter parameters, etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

More specifically, the entropy decoding component 500 decodes bits from the bit stream using context-adaptive binary arithmetic decoding to recover bins. The entropy decoding component 500 then debinarizes the bins to recover the encoded syntax elements. As was previously mentioned, the particular sequence of bins for each syntax element is specified by the video coding standard in use.

The entropy decoding component 500 entropy decodes syntax elements for partitioning modes according to a partitioning enablement flag signaled in the compressed bit stream. In some embodiments, a partitioning enablement flag is signaled for the entire video sequence being encoded, i.e., is signaled in the sequence parameter set. In some embodiments, partitioning enablement flags may be signaled at other levels, e.g., at the picture or slice level. If the partitioning enablement flag indicates that all partitioning modes were enabled for inter-prediction, the entropy decoding component 500 expects a sequence of bins as per Table 2 for partitioning mode syntax elements. If the partitioning enablement flag indicates that asymmetric partitioning modes are disabled, the entropy decoding component 500 expects a sequence of bins as per Table 4 for partitioning mode syntax elements. If the partitioning enablement flag indicates that asymmetric partitioning modes and non-square symmetric partitioning modes are disabled, the entropy decoding component 500 expects a sequence of bins as per Table 5 for partitioning mode syntax elements.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

Figure 6:
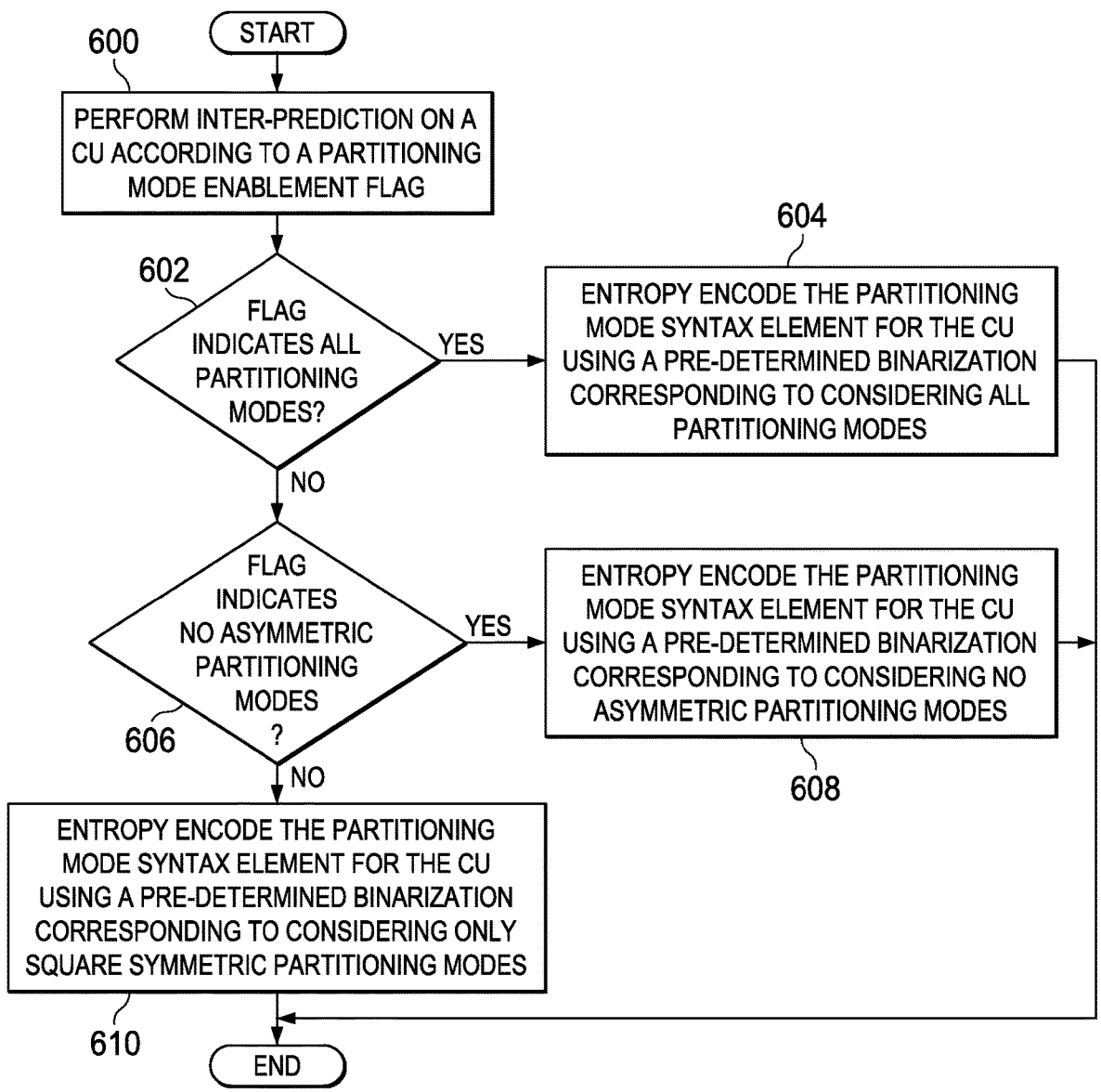
FIGS. 6 and 7 are flow diagrams of methods.

FIG. 6 is a flow diagram of a method for scalable prediction type coding in an encoder. Initially, inter-prediction is performed 600 for a coding unit (CU), e.g., by a motion estimation component 420 of FIG. 4, according to a partitioning enablement flag. As previously described, the partitioning enablement flag indicates which of multiple partitioning modes specified in a video coding standard are to be considered when determining the best inter-prediction for the CU. In some embodiments, the value of the flag is indicated at the video sequence level. In some embodiments, the value of the flag is indicated at the picture level. In some embodiments, the value of the flag is indicated at the slice level. Depending on the value of the flag, all partitioning modes are considered during inter-prediction or a subset of the partitioning modes is considered. The multiple partitioning modes may include both symmetric partitioning modes and asymmetric partitioning modes. The symmetric partitioning modes may include both square symmetric partitioning modes and non-square symmetric partitioning modes. The subset of partitioning modes may be the symmetric partitioning modes or may be the square symmetric partitioning modes.

After inter-prediction is complete, the syntax element indicating the particular partitioning mode chosen for the CU is entropy encoded based on the value of the partitioning enablement flag if the CU is inter-predicted. That is, if the partitioning enablement flag indicates 602 that all partitioning modes were considered for inter-prediction, the partitioning mode syntax element for the CU is entropy encoded 604 using a pre-determined binarization corresponding to using all partitioning modes, e.g., the binarization of Table 2. If the partitioning enablement flag indicates 606 that no asymmetric partitioning modes were considered for inter-prediction, the partitioning mode syntax element for the CU is entropy encoded 608 using a pre-determined binarization corresponding to considering no asymmetric partitioning modes, e.g., the binarization of Table 4. Otherwise, the partitioning mode syntax element for the CU is entropy encoded 608 using a pre-determined binarization corresponding to considering only square symmetric partitioning modes, e.g., the binarization of Table 5.

Figure 7:
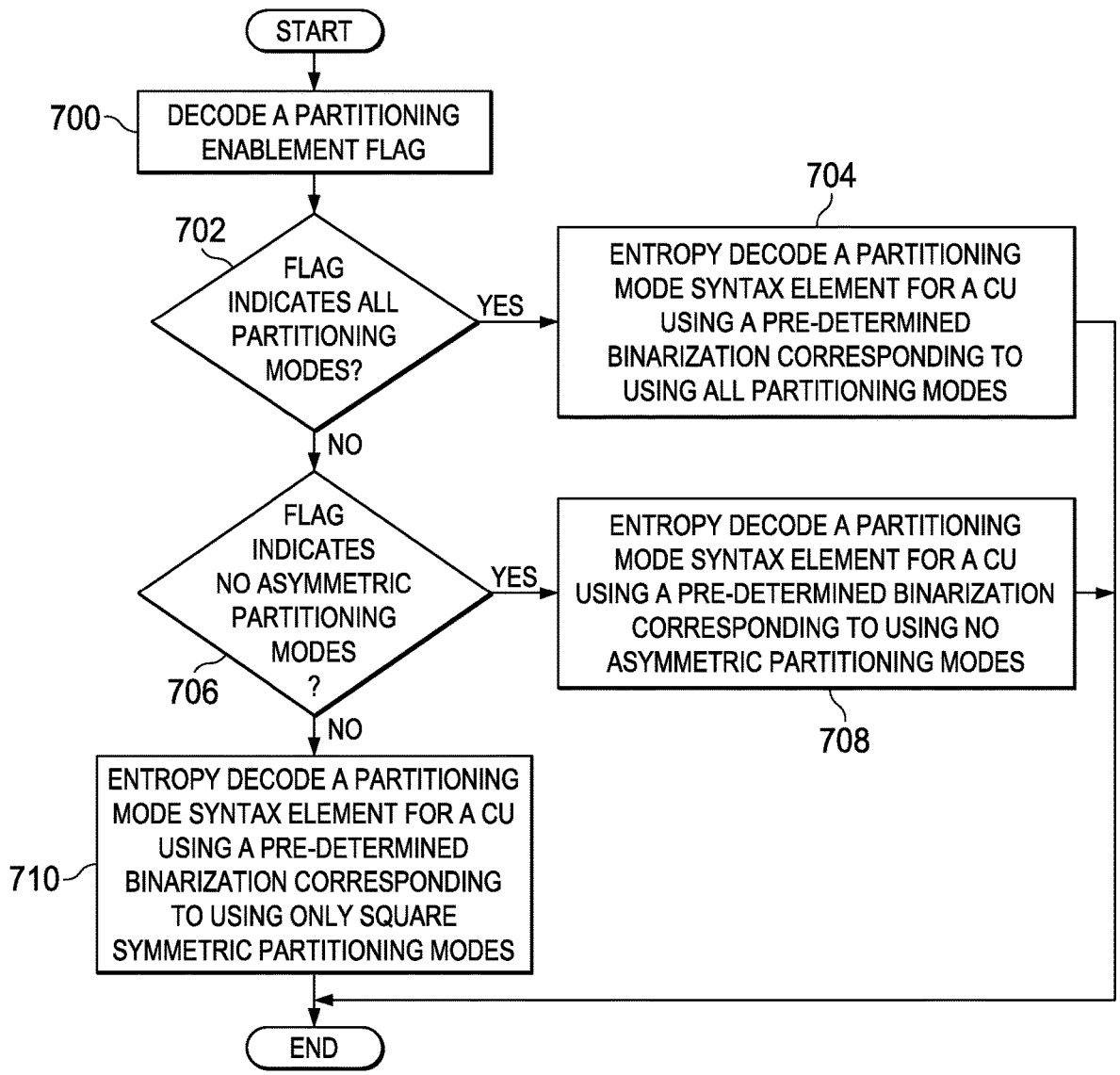

FIG. 7 is a flow diagram of a method for scalable prediction type coding in a decoder. Initially, a partitioning enablement flag 700 is decoded from a compressed bit stream, e.g., by an entropy decoding component 500 of FIG. 5. As previously described, the partitioning enablement flag indicates which of multiple partitioning modes specified in a video coding standard were considered when determining the best inter-prediction for a CU. In some embodiments, the value of the flag is signaled in the compressed video bit stream at the video sequence level. In some embodiments, the value of the flag is signaled in the compressed video bit stream at the picture level. In some embodiments, the value of the flag is signaled in the compressed video bit stream at the slice level. Depending on the value of the flag, all partitioning modes were considered during inter-prediction or a subset of the partitioning modes was considered. The multiple partitioning modes may include both symmetric partitioning modes and asymmetric partitioning modes. The symmetric partitioning modes may include both square symmetric partitioning modes and non-square symmetric partitioning modes. The subset of partitioning modes may be the symmetric partitioning modes or may be the square symmetric partitioning modes.

The syntax element indicating the particular partitioning mode chosen for a CU is entropy decoded based on the value of the partitioning enablement flag. That is, if the partitioning enablement flag indicates 702 that all partitioning modes were considered for inter-prediction in the encoder, the partitioning mode syntax element for the CU is entropy decoded 704 using a pre-determined binarization corresponding to using all partitioning modes, e.g., the binarization of Table 2. If the partitioning enablement flag indicates 706 that no asymmetric partitioning modes were considered for inter-prediction in the encoder, the partitioning mode syntax element for the CU is entropy decoded 708 using a pre-determined binarization corresponding to considering no asymmetric partitioning modes, e.g., the binarization of Table 4. Otherwise, the partitioning mode syntax element for the CU is entropy decoded 708 using a pre-determined binarization corresponding to considering only square symmetric partitioning modes, e.g., the binarization of Table 5.

Figure 8:
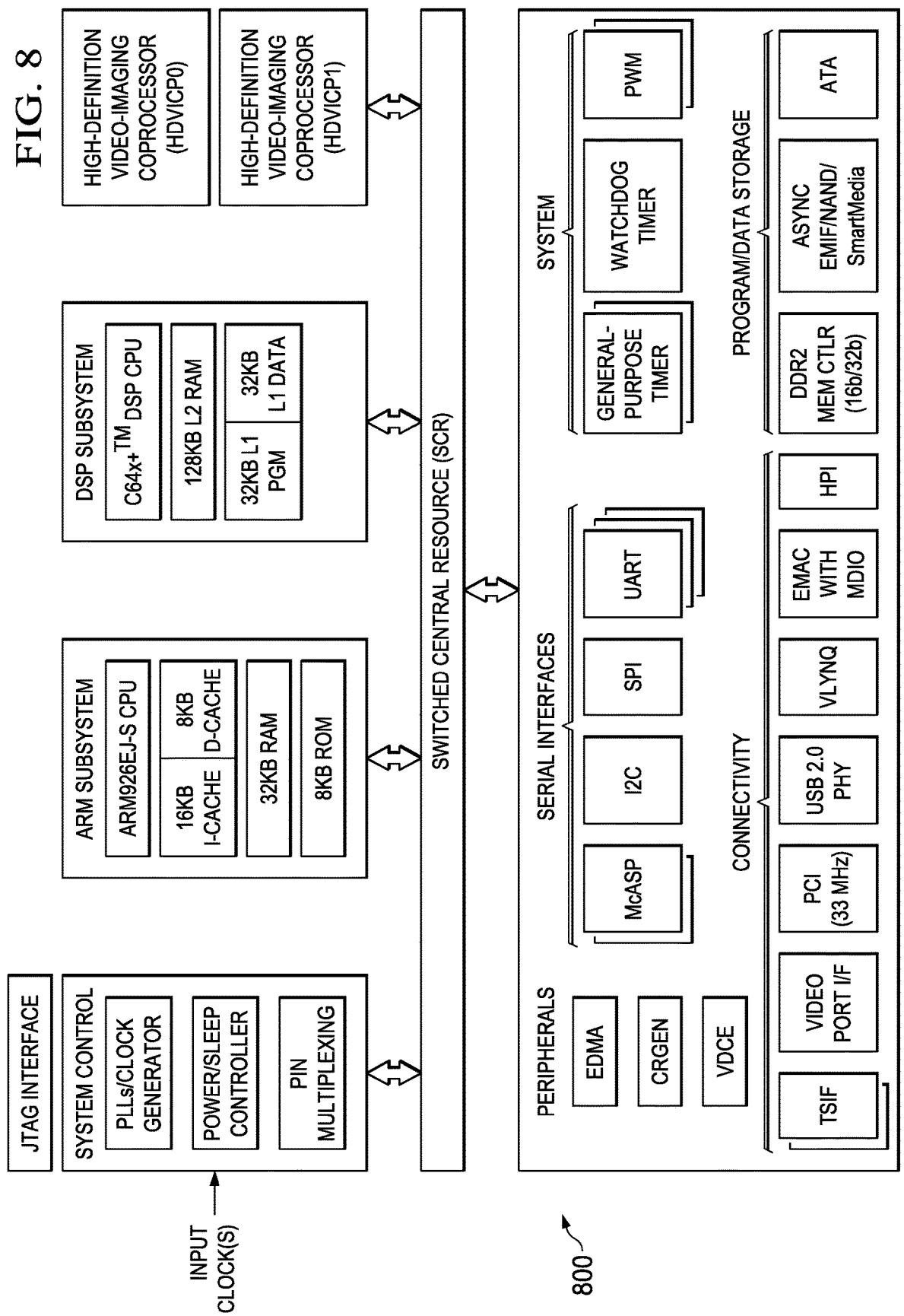
FIG. 8 is a block diagram of an illustrative digital system.

FIG. 8 is a block diagram of an example digital system suitable for use as an embedded system to implement a video encoder and/or a video decoder. The video encoder may be configured to perform scalable prediction type coding during the encoding process as described herein. The video decoder may be configured to perform scalable prediction type coding of a compressed bit stream as described herein during the decoding process. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to perform scalable prediction type coding as described herein when encoding a video sequence and/or when decoding a compressed video bit stream. For example, the coding control of the video encoder of FIG. 4 may be executed on the DSP subsystem or the ARM subsystem and at least some of the computational operations of the block processing, including intra-prediction, motion estimation, entropy encoding, and entropy decoding may be executed on the HDVICP coprocessors. Similarly, at least some of the computational operations of the video decoder of FIG. 5 may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which asymmetric and non-square symmetric partitioning modes are provided for inter-prediction but not for intra-prediction. One of ordinary skill in the art will understand embodiments in which some or all of the asymmetric and/or non-square symmetric partitioning modes are also provided for intra-prediction and may be similarly coded in a scalable fashion based on which modes are used for intra-prediction.

In another example, the eight partitioning modes described herein as well as the particular division of the partitioning modes into subsets are merely examples. More or fewer partitioning modes may be used in other embodiments. For example, in some embodiments, the partitioning modes may not include asymmetrical partitioning modes. Or, in some embodiments, the partitioning modes may not include non-square symmetrical partitioning modes. Further, more or fewer subsets may be used in other embodiments and/or the partitioning modes included in the subsets may differ. For example, in some embodiments, the subsets may be 1) the square symmetric partitioning modes and the asymmetrical partitioning modes, and 2) the square partitioning modes. Or, in some embodiments, there may be a single subset made up of the symmetric partitioning modes.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed by a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding a video sequence in a video encoder, the method comprising:

signaling in a slice header of a bit stream whether a subset of a plurality of partitioning modes includes non-square symmetric partitioning modes, whether the subset of the plurality of partitioning modes includes asymmetric partitioning modes and whether the subset of the plurality partitioning mode excludes both asymmetric partitioning modes and non-square symmetric partitioning modes;

using only the subset of the partitioning modes for prediction of a portion of the video sequence;

selecting a binarization from a plurality of binarizations based on whether the subset of the plurality of partitioning modes includes the non-square symmetric partitioning modes and whether the subset of the partitioning modes includes the asymmetric partitioning modes;

binarizing at least one partitioning mode syntax element corresponding to the portion of the video sequence based on the selected binarization; and entropy encoding the binarized partitioning mode syntax element.

2. The method of claim 1, wherein the portion of the video sequence is one selected from a group consisting of the entire video sequence, a picture in the video sequence, and a slice of a picture in the video sequence.

3. The method of claim 1, wherein the plurality of partitioning modes consists of a 2N×2N partitioning mode, an N×2N partitioning mode, a 2N×N partitioning mode, an N×N partitioning mode, a 2N×nU partitioning mode, a 2N×nD partitioning mode, an nL×2N partitioning mode, and an nR×2N partitioning mode, wherein N is one half of a vertical and horizontal size of a coding unit, n is one fourth of 2N, U indicates an upper portion of a coding unit, D indicates a lower portion of a coding unit, L indicates a left portion of a coding unit, and R indicates a right portion of a coding unit.

4. The method of claim 1, wherein the plurality of partitioning modes further includes a plurality of symmetric partitioning modes.

5. The method of claim 4, wherein the portion of the video sequence is the entire video sequence.

6. The method of claim 4, wherein the plurality of symmetric partitioning modes further includes a plurality of non-square symmetric partitioning modes.

7. A method comprising:
decoding a partitioning enablement flag from a slice header in a bit stream, wherein the partitioning enablement flag indicates whether a subset of a plurality of partitioning modes used to encode a portion of the video sequence in the bit stream includes non-square symmetric partitioning modes, whether the subset of the plurality of partitioning modes includes asymmetric partitioning modes, whether the subset of the plurality partitioning mode excludes both asymmetric partitioning modes and non-square symmetric partitioning modes;

selecting a predetermined binarization from a plurality of predetermined binarizations based on whether the subset of the plurality of partitioning modes includes the non-square symmetric partitioning modes, and whether the subset of the partitioning modes includes the asymmetric partitioning modes;

debinarizing at least one partitioning mode syntax element corresponding to the portion of the video sequence based on the selected predetermined binarization; and entropy decoding the debinarized partitioning mode syntax element.

8. The method of claim 7, wherein the portion of the video sequence is one selected from a group consisting of the entire video sequence, a picture in the video sequence, and a slice of a picture in the video sequence.

9. The method of claim 7, wherein the plurality of partitioning modes consists of a 2N×2N partitioning mode, an N×2N partitioning mode, a 2N×N partitioning mode, an N×N partitioning mode, a 2N×nU partitioning mode, a 2N×nD partitioning mode, an nL×2N partitioning mode, and an nR×2N partitioning mode, wherein N is one half of a vertical and horizontal size of a coding unit, n is one fourth of 2N, U indicates an upper portion of a coding unit, D indicates a lower portion of a coding unit, L indicates a left portion of a coding unit, and R indicates a right portion of a coding unit.

10. The method of claim 7, wherein the plurality of partitioning modes further includes a plurality of symmetric partitioning modes.

11. The method of claim 10, wherein the portion of the video sequence is the entire video sequence.

12. The method of claim 10, wherein the plurality of symmetric partitioning modes further includes a plurality of non-square symmetric partitioning modes.

* * * * *